April 11, 1944.　　　T. A. BOWERS　　　2,346,204
SHEET METAL PISTON RING
Filed Aug. 3, 1942　　　3 Sheets-Sheet 1
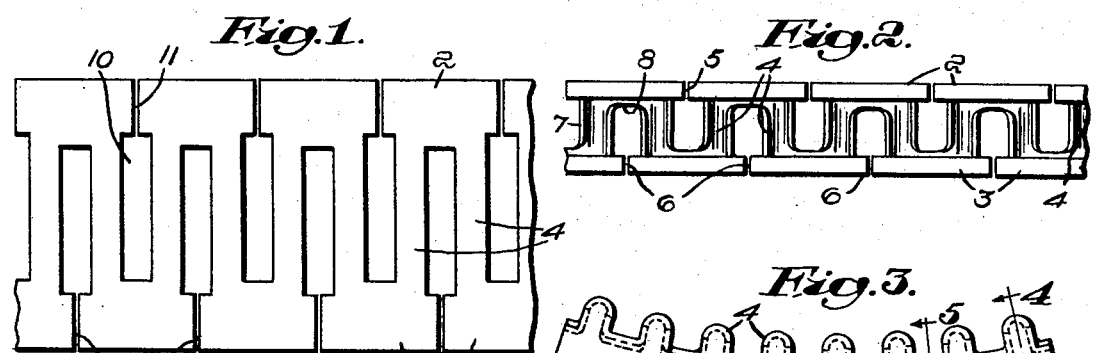
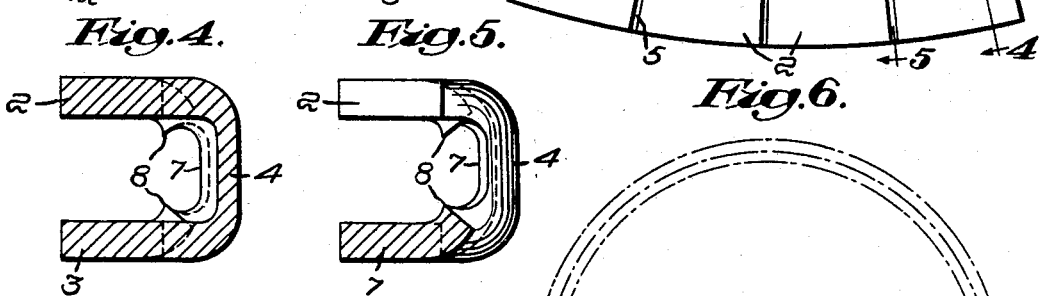
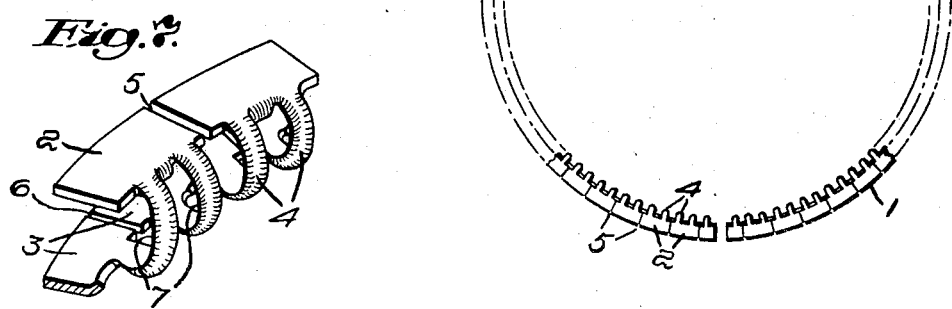
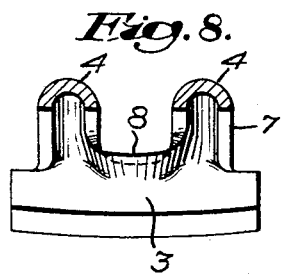
Inventor:
Thomas A. Bowers
by Munn V. Hamilton
Attorney April 11, 1944.  T. A. BOWERS  2,346,204
SHEET METAL PISTON RING
Filed Aug. 3, 1942   3 Sheets-Sheet 2
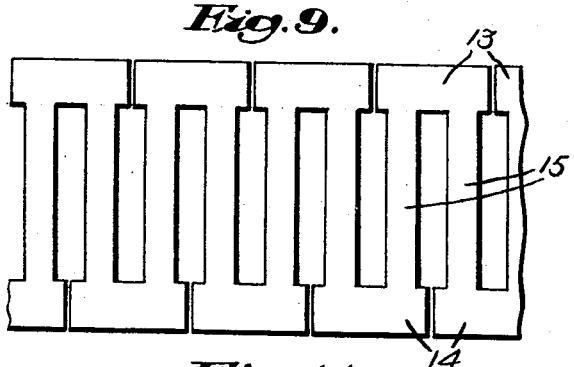
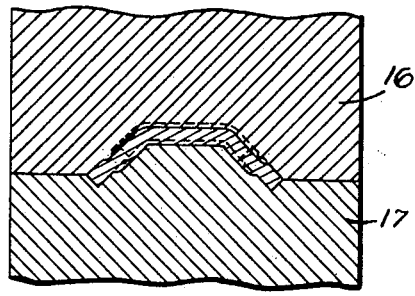
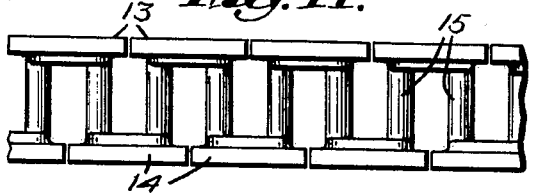
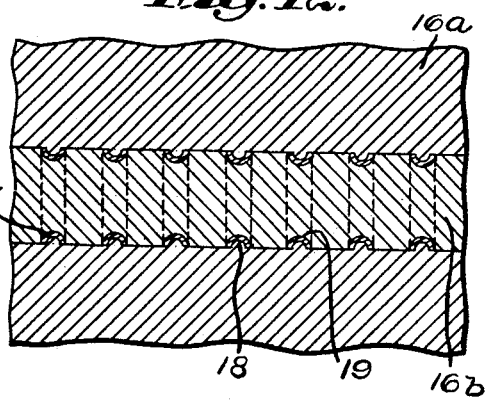
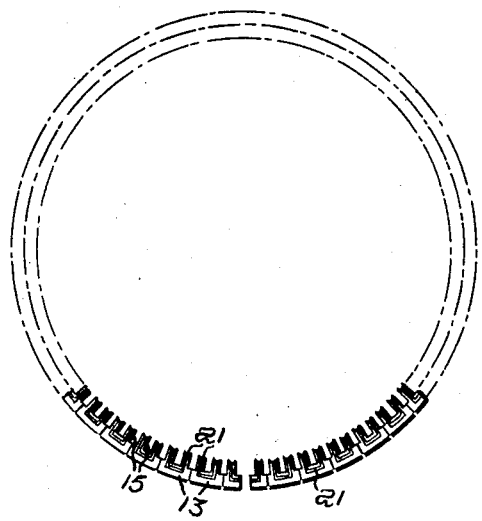
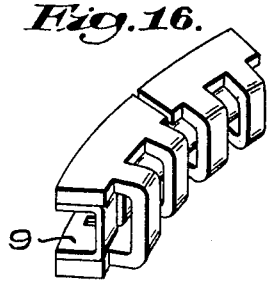

April 11, 1944. T. A. BOWERS 2,346,204
SHEET METAL PISTON RING
Filed Aug. 3, 1942 3 Sheets-Sheet 3
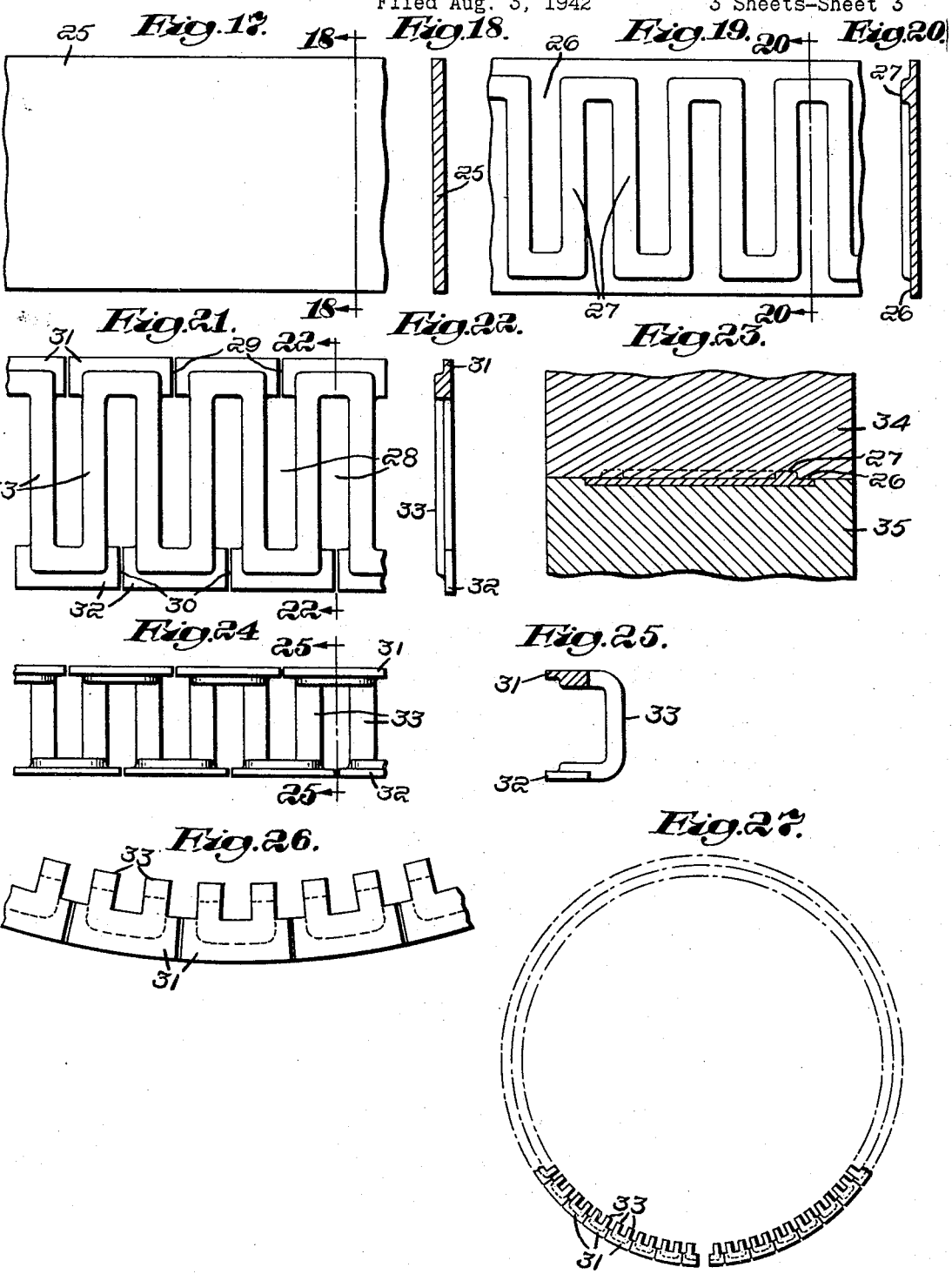
Inventor:
Thomas A. Bowers
by
Attorney Patented Apr. 11, 1944

2,346,204

UNITED STATES PATENT OFFICE 2,346,204

SHEET METAL PISTON RING

Thomas A. Bowers, Mattapoisett, Mass., assignor to Power Research Corporation, Boston, Mass., a corporation of Massachusetts Application August 3, 1942, Serial No. 453,428

4 Claims. (Cl. 309—45)

This invention relates to piston rings and more especially to piston rings of the oil metering type.

An object of the invention is to improve piston rings and to devise a flexible piston ring which is formed with improved reinforcing means. Another object is to provide an improved method of making these rings and one which may be easily and cheaply carried out. The invention also aims to provide a simple, durable and efficient piston ring.

In the accompanying drawings:

Figure 1 is a fragmentary plan view illustrating a step in the method of making the piston ring of the invention;

Fig. 2 is an elevational view illustrating another step in the method referred to;

Fig. 3 is a fragmentary plan view illustrating still another step in the method;

Fig. 4 is a cross section taken on the line 4—4 of Fig. 3;

Fig. 5 is a cross section taken on the line 5—5 of Fig. 3;

Fig. 6 is a plan view of a finished ring;

Fig. 7 is an enlarged fragmentary perspective view of the ring;

Fig. 8 is another enlarged fragmentary perspective view;

Fig. 9 is a fragmentary plan view of a strip of sheet metal illustrating a step in a modified method of making a piston ring;

Fig. 10 is a fragmentary cross sectional view illustrating die means employed in carrying out a step in the modified method;

Fig. 11 is a fragmentary elevational view illustrating another step;

Fig. 12 is a fragmentary cross sectional view of die means employed in still another step;

Fig. 13 is a fragmentary plan view of the modified ring resulting from the steps illustrated in Figs. 9–12 inclusive;

Fig. 14 is a fragmentary plan view of the modified ring;

Fig. 15 is a cross section taken on the line 15—15 of Fig. 14;

Fig. 16 is a fragmentary perspective view of another modification of the invention;

Figs. 17 to 27 inclusive relate to still another modification of piston ring of the invention.

In an earlier patent, No. 2,224,338, issued to me December 10, 1940, I have described and claimed an improved oil control piston ring which may, for example, be formed from a strip of resilient piston ring material such as a resilient steel or other suitable material. In making the ring of the patent referred to, portions of the strip are punched out to provide openings extending transversely within the body of the strip, and edge portions of the strip are sheared transversely of the strip to form slits or gaps which connect with the first mentioned openings. The gaps along one edge of the strip are staggered with relation to the gaps along an opposite edge, with the result that there are provided segments or crown portions occurring in staggered relation at opposite edges of the strip. The strip thus formed is folded longitudinally to provide a straight length of piston ring material of generally U-shaped cross section presenting spaced-apart oil scraping edges. The U-shaped strip is thereafter bent into an annular shape to constitute a piston ring.

The gaps provide for the segments being circumferentially spaced apart. When the ends of the ring are brought into abutting relation, the segments may be compacted against one another, thus decreasing the circumference of the ring. In this compacted state the ring is mounted in a piston and cylinder. The resilient nature of the piston ring material tends to urge the segments back into their normal spaced-apart position, thus providing circumferential and radial extensibility, which tends to force the ring against the cylinder wall. In practice a ring is employed slightly greater in circumference than the cylinder in which it reciprocates. The ring operates in a slightly compacted position in which it develops a desirable wall pressure, which is exerted uniformly at all points in and around the cylinder irrespective of worn or irregular areas therein.

Referring more in detail to the drawings and especially to Figures 1–8 inclusive, numeral 1 denotes a flexible piston ring of the type described in the above noted patent. The ring 1 is made up of an upper circular row of segments 2 and a lower circular row of segments 3 connected together by connecting portions 4.

Each of the segments 2 and 3 has at least two connecting portions extending radially inward therefrom to connect with segments at an opposite side of the ring. Other arrangements of connecting portions may also be resorted to.

Numeral 5 denotes gaps or interstices occurring between the upper rows of segments 2, and numeral 6 refers to gaps or interstices occurring between segments of the lower row and in staggered relation with respect to the gaps 5. The gaps permit the crowns to be compacted and thereafter develop resiliency as above described.

In accordance with the present invention, the ring is further formed with reinforcing means occurring at localized points therealong. The reinforcing means preferably consists of corrugations or ridges which are arranged to extend throughout selected portions of the ring.

The reinforcing means may be of various forms and may occur at the connecting portions 4, the crown portions 2 and 3, or at both the connecting portions and crown portions.

In Figs. 1-8 a preferred embodiment of the invention has been illustrated in which the connecting portions have been bent or corrugated along lines of bending which extend axially of the ring so as to provide rounded surfaces at the inner periphery of the ring and edges which project from the opposite surfaces of the connecting portions. The inner peripheral edges of the crowns 2 at points occurring between the web portions 4 also have been bent or corrugated inwardly and downwardly along curved lines of bending to form ridge portions 8 which are a continuation of the ridges 7.

It is pointed out that as the ridges 7 in the web portions 4 extend in a generally axial direction, they reinforce the web portions and impart stiffness with respect to forces tending to bend the web portions axially upon themselves. It should also be observed that the stiffness or rigidity thus achieved is secured without modifying the general flexibility and resiliency of the ring obtained from the circumferentially spaced-apart arrangement of the crowns and resilient webs already described.

In a ring of the flexible type disclosed, in which circumferentially spaced-apart crowns are arranged in upper and lower annular rows, the crowns constitute annular seating or sealing surfaces of the ring. It is desirable to maintain as nearly as possible all of the crowns of one row parallel to crowns of the other row, so that the continuity of the seating surfaces, when the ring is in a compacted position, is substantially preserved. While the ring of the patent above referred to is quite capable of maintaining the parallel relation of the crowns in most cases, it is conceivable that the rings may be subjected to rough handling by which some of the crowns become bent.

The immediate result of stiffening the web portions in accordance with the present invention is to greatly reduce the possibility of the crowns of one row from being bent toward or away from crowns of the other row even during rough handling.

This is especially of advantage in connection with mounting a ring of the flexible type in a cylinder where a tapered sleeve may be employed to slide a piston and ring into a cylinder, and relatively greater pressures may be exerted against one of the annular rows of segments than occurs at the other of the rows during assembly.

During the insertion of a flexible piston ring in a cylinder and piston, there may further develop the possibility of a crown of one end of the ring extending over and becoming momentarily engaged upon a crown of the other end of the ring. The added strength obtained from the corrugations or ridges is especially effective in resisting bending or distortion of the crowns at the ends of the ring.

The grooved reinforcing ribs or ridges 8 extend in part in a direction circumferentially of the ring, and thus afford a reinforcing means for preventing the crowns from being bent along lines of bending extending radially of the ring. The ridges 8 are also helpful in connection with preventing bending of crowns at the extremities of the ring, as just above described, by reason of the ends becoming engaged over one another.

The combined effect of ridges or corrugations in both webs and crowns is to provide an exceedingly tough durable ring which resists bending in handling so that no deformation of the land surface may occur. At the same time there is no reduction in the radial and circumferential flexibility and resiliency of the ring since the ridges occur at localized areas and do not modify the circumferential compressibility of the ring.

Several advantages are obtained by the corrugated type of construction noted. The substantially increased strength of the ring resulting from the corrugated webs permits the use of a much thinner sheet metal than may otherwise be employed. This not only reduces the cost of the piston ring material, but greatly simplifies and facilitates punching and shearing operations throughout the process of making the ring. The use of relatively thinner sheet metal permits faster and more continuous cutting operations, thus further cheapening the cost of the ring.

Since corrugating the web decreases their circumferential width, as they occur in a stamped form such as illustrated in Fig. 1, relatively wider web portions may be stamped which permits a less number of punching operations being resorted to. The entire body of the ring takes on new strength and rigidity at localized points while desirable resiliency and flexibility, especially circumferential and radial resiliency and flexibility, are preserved at all desired points.

One preferred method of making the piston ring of the invention has been illustrated in Figs. 1-6 inc., in which a strip of sheet material is formed with slots 10 and cuts 11 and 12, thereby defining the crown portions 2 and 3 and the web portions 4 already described. The strip is then bent longitudinally of itself to form a length of material of generally U-shaped cross section as has been illustrated in Fig. 2.

The bending of the webs is preferably carried out by passing the strip through dies which are provided with spaced-apart rib portions or teeth adapted to corrugate the web portions so that edges of the webs are bent toward one another to form grooves which are open inside of the ring. The dies may be further formed with portions which force the edges of the inner peripheries of the crowns occurring between the web portions inwardly and downwardly, in a continuation of the bent edges of the webs.

The strip of material thus bent and corrugated may then be bent into an annular form such as has been illustrated in Fig. 3. A length suitable for providing a desired size of piston ring is then cut off to provide a completed ring, such as has been illustrated in Fig. 6. If desired, various changes in the method of making the ring may be resorted to, as for example by changing the sequence of the various operations, or by resorting to alternate or modified cutting and forming operations to secure reinforced portions. Also if desired, other types of corrugations, as corrugations of a more extended character presenting a plurality of ridges, or other formations in each of the web portions, may be used.

Figs. 9-15 inclusive illustrate another modified method of making a ring in which the corrugations are carried out to provide ridges or edges which project at the inner periphery of the ring.

In Fig. 9 I have illustrated a strip of piston ring material formed in the manner described with crowns 13 and 14 and webs 15. The strip is bent longitudinally of itself in die members 16 and 17 which are formed with rib portions 18 and depressions 19, by means of which the webs 15 are corrugated to form projecting edges 20 having grooves 21 occurring therebetween. The grooves open at the inner periphery of the ring and continue into the crown portions 13 and 14 to extend circumferentially therealong for a distance corresponding to the space between the web portions.

Advantages similar to those noted in connection with the corrugated web portions illustrated in Figs. 9-15 inclusive are obtained.

Fig. 16 illustrates another means of reinforcing a flexible ring and discloses a second ring member 9 of U-shaped cross section interposed between the annular rows of crowns. This second ring 9 is of an axial height corresponding to the distance between the rows of crowns and prevents their being bent toward one another.

Figs. 17-27 inclusive illustrate still another modification of piston ring in which a strip of piston ring material 25 is formed with dies to provide relatively thin portions 26 and relatively thick portions 27. The strip is then formed with slots 28 and cuts 29 and 30, which define crown portions 31 and 32 and web portions 33, the crown portions being relatively thinner than the web portions. The thinning operation may be carried out in die members as 34 and 35, diagrammatically illustrated in Fig. 23.

The formed strip is folded longitudinally of itself as illustrated in Fig. 24 to provide a length of material of generally U-shape cross section. Thereafter the strip is bent into an annular body to provide a finished ring as illustrated in Figs. 26 and 27.

This modification of piston ring and its method of manufacture is intended to be illustrative of another means of securing a reinforced web and crown construction in a flexible piston ring, other than the corrugating steps already described, and is characterized by advantages similar to those described in connection with Figs. 1-8 inclusive.

While I have shown a preferred embodiment of my invention, it should be understood that various changes and modifications may be resorted to, in keeping with the spirit of the invention as defined by the appended claims.

I claim:

1. A piston ring comprising a strip of resilient sheet metal formed into an annular body, said sheet material folded longitudinally of the strip to provide circumferential land surfaces and connecting web portions, said annular body having openings extending between the said circumferential surfaces and web portions, said opening defining circumferentially spaced-apart segments in the land surfaces, said connecting portions being corrugated to form re-shaped ridges which extend axially of the ring along inner peripheral surfaces of the web portions.

2. A piston ring comprising a strip of resilient sheet metal formed into an annular body, said sheet metal folded longitudinally of the strip to provide circumferential land surfaces and connecting web portions, said annular body having openings extending between the said circumferential surfaces and web portions, said openings defining circumferentially spaced-apart crowns in the land surfaces, inner peripheral edges of said crowns at points between the web portions being bent inwardly and downwardly to form reinforcing edges, said web portions having inwardly bent edges which are coextensive with the reinforcing edges of the crowns.

3. A piston ring comprising a strip of resilient sheet metal formed into an annular body, said sheet metal folded longitudinally of the strip to provide land surfaces and connecting web portions, said annular body having openings extending between the said land surfaces and web portions, said openings defining circumferentially spaced-apart crowns in the land surfaces, inner peripheral edges of said crowns at points between the web portions being bent inwardly and downwardly to form reinforcing edges, said webs being corrugated to provide reinforcing edges which are a continuation of the reinforcing edges of the crowns.

4. A flexible piston ring comprising a strip of sheet metal having openings transversely formed therealong in overlapping relation to form crowns and connecting webs, said strip being bent longitudinally of itself and having its edges occurring at the outer periphery of the ring in axially spaced-apart relation, the openings of one edge being staggered with respect to the openings of the other edges, said crowns having ridges which extend circumferentially of the ring, and said webs being formed with relatively thick ridge portions which are a continuation of said ridges in the crowns.

THOMAS A. BOWERS.